March 15, 1949.　　　T. DUNNER ET AL　　　2,464,564
EMERGENCY TRACTION DEVICE
Filed Aug. 15, 1946　　　　　　　　　　2 Sheets-Sheet 1
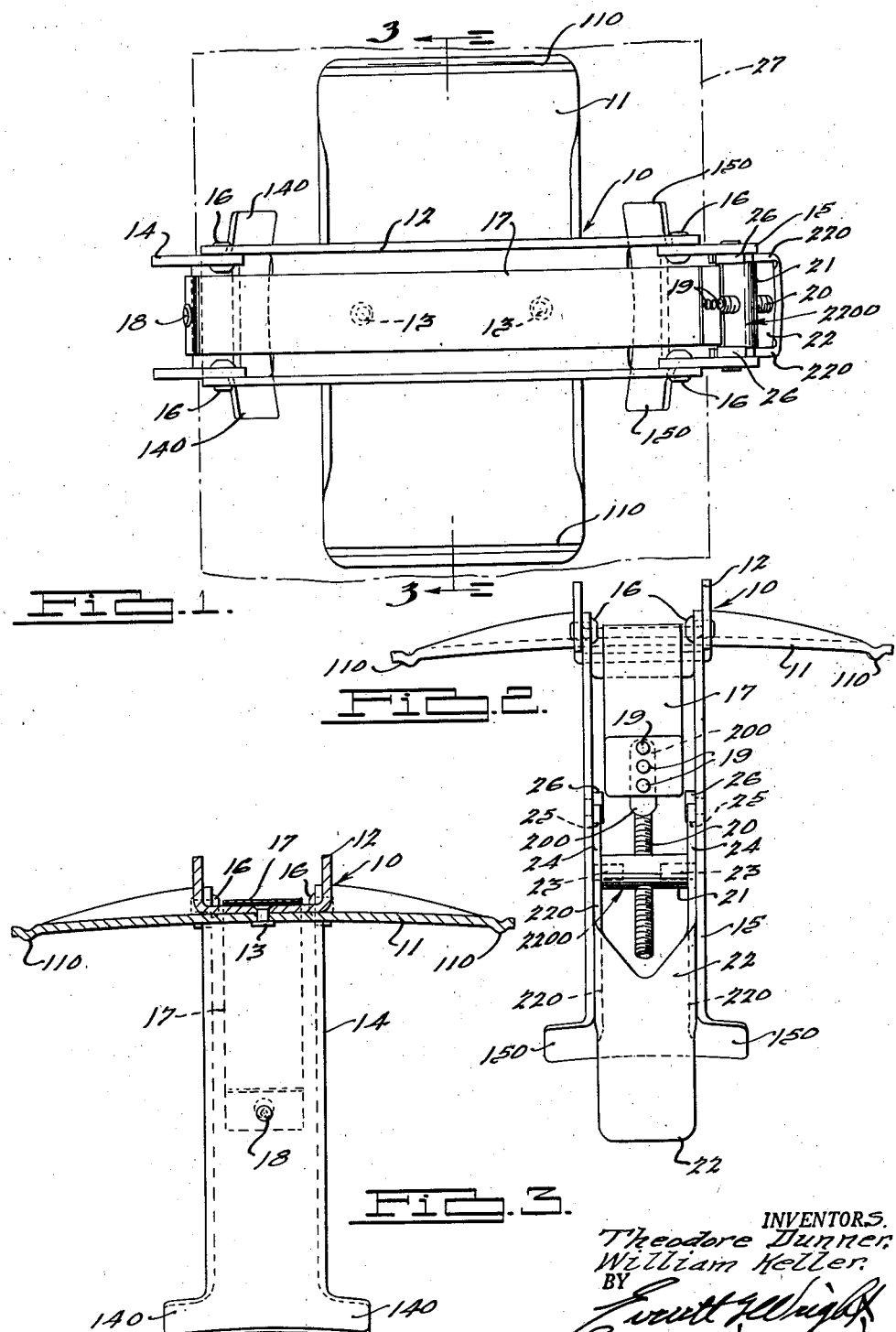
INVENTORS.
Theodore Dunner,
William Heller.
BY
Everett W. Wright
ATTORNEY.

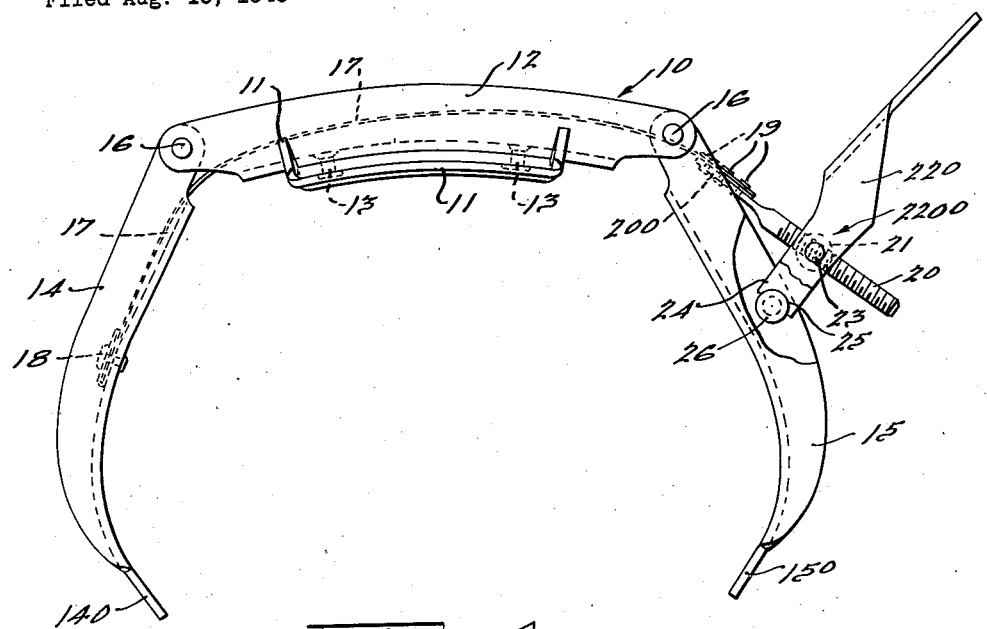
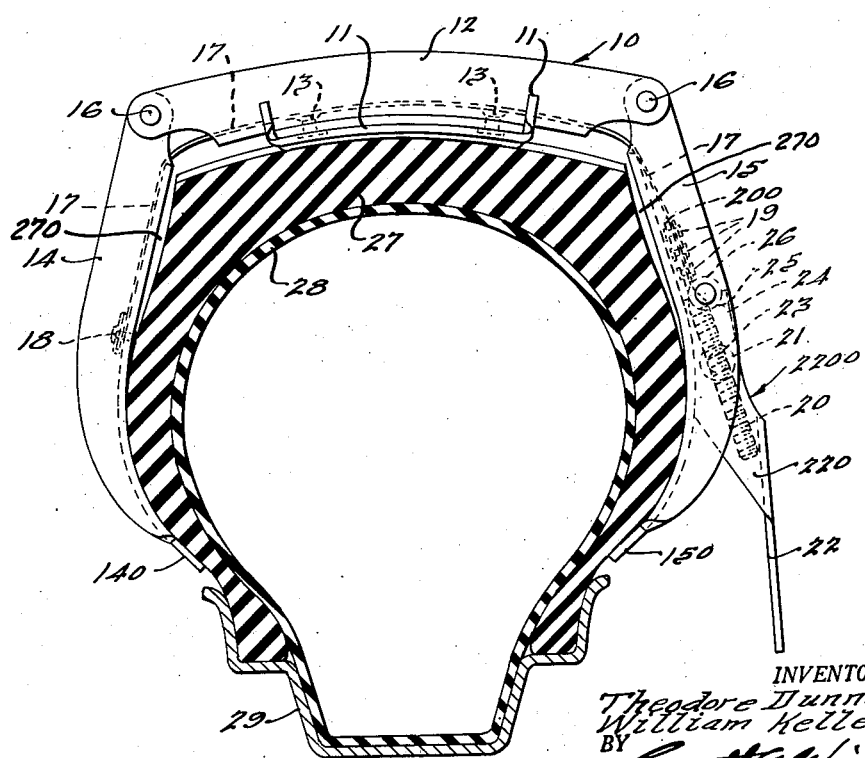

Patented Mar. 15, 1949

2,464,564

UNITED STATES PATENT OFFICE 2,464,564

EMERGENCY TRACTION DEVICE

Theodore Dunner, Farmington, and William Keller, Flint, Mich.

Application August 15, 1946, Serial No. 690,636

5 Claims. (Cl. 152—227)

This invention relates to emergency traction devices adapted to be applied to the pneumatic tires of automobiles and trucks.

There have been many types of traction devices, anti-skid devices and supplemental traction devices developed for use in improving the traction of pneumatic automobile and truck tires. These devices have been more or less satisfactory in one feature or another, but none of the prior art emergency traction devices have been characterized by being generally satisfactory in performance.

With the foregoing in view, the primary object of the invention is to provide an emergency traction device which is easily and readily attached to and removed from a pneumatic tire without tools or wrenches, which may be adjusted minutely to fit any pneumatic tire of a given size in any state of tread wear, which is positive in attachment to the tire, which will not become accidentally loosened from the tire to which it is attached, and which will not creep during use.

Other objects of the invention will become apparent by reference to the following detailed description taken in connection with the accompanying drawings, in which:

Fig. 1 is a plan view of an emergency traction device embodying the invention.

Fig. 2 is a longitudinal elevational view taken on the right hand side of the emergency traction device as viewed in Fig. 1.

Fig. 3 is a longitudinal sectional view taken on the line 3—3 of Fig. 1.

Fig. 4 is a transverse elevational view of the emergency traction device in its expanded position ready to be placed on a tire.

Fig. 5 is a transverse sectional view of a pneumatic tire with the emergency traction device positioned thereon.

Referring now to the drawings wherein like numerals refer to like corresponding parts throughout the several views, the particular embodiment of the emergency traction device disclosed for the purpose of illustrating the invention comprises, in general, a traction cleat 10 composed of a longitudinally disposed shoe 11 having a transverse channel shaped lug 12 riveted thereto by rivets 13, a channel shaped tire engaging clamp arms 14 and 15 hingedly riveted to opposite ends of the transverse lug 12 by means of suitably driven rivets 16, a flexible steel strap or thong 17 disposed in the channel shaped lug 12 and tire engaging arms 14 and 15 and secured at one end by a rivet 18 to the channel shaped tire engaging arm 14 and secured at the other end by the rivet 19 to the flattened upper end 200 of an adjusting screw 20 which is threaded through a cylinder 21 journaled laterally between the flanges 220 of a channel shaped toggle arm 22 by means of pivot pins 23 pressed into the ends of the said cylinder 21 and extending through suitable apertures provided in the flanges of the said toggle arm 22 therefor. The said toggle arm 22 is bifurcated at its upper end to provide a pair of upwardly extending prongs 24 which are arcuately formed at their ends 25 to engage fulcrum pins 26 riveted to the inside of the flanges of the channel shaped tire engaging arm 15.

The said longitudinally disposed shoe 11 is curved to fit generally the periphery of a tire 27 and is provided with a pair of transversely disposed depending ribs 110 which engage the thread of the tire 27 and aids in preventing creeping of the emergency traction device when in use. The lower ends of the channel shaped tire engaging arms 14 and 15 are formed arcuate in shape and are provided with ears 140 and 150 respectively which firmly grip the side walls of a tire 27 when the emergency traction device is positioned thereon.

The tire engaging arms 14 and 15 are so shaped as to provide a space 270 between them and the side of the tire 27 whereby to permit the tire 27 to bulge laterally near the tread thereof when the emergency traction device is at work. The tire 27 is shown with an inner tube 28 mounted on the rim 29 of a wheel to show the relationship between the emergency traction device is operatively mounted on the tire.

By minute adjustment of the length of the steel strap or thong 17 by turning the toggle arm assembly 2200 composed of the cylinder 21 and the toggle arms 22 with respect to the adjusting screw 20, the extent to which the tire engaging arms 14 and 15 close with respect to each other around the tire 27 is regulated. Thus, regardless of reasonable difference in size and shape of a tire or the extent of wear of the tread thereof, an emergency traction device embodying the invention may be fit properly to a tire applied thereto ready for use in a minimum of time and with a minimum of effort. Extensive tests and use of the device under various conditions of mud, snow and ice have proven that emergency traction devices embodying the invention function surely and safely under both light and heavy loads, and that they can be readily applied to and easily removed from the pneumatic tired wheels of automobile, trucks and the like.

Although but a single embodiment of the invention has been disclosed and described in detail, it is obvious that many changes may be made in the size, shape, arrangement and detail of the various elements of the invention as defined by the appended claims.

We claim:

1. An emergency traction device for pneumatic tires comprising a channel shaped transverse lug, a pair of channel shaped tire engaging clamp arms hingedly secured to the outer ends of the transverse lug formed to engage the side walls of a tire near the rim of a wheel on which the tire is mounted and inwardly with respect to the widest portion of the said tire, and a thong fixed at one end to one tire engaging clamp arm extending across said transverse lug including toggle mechanism on the other end thereof adapted to engage the other tire engaging clamp arm whereby to removably secure the said emergency traction device on a tire, the said thong and toggle mechanism being disposed between the flanges of the said channel shaped lug and clamp arms.

2. An emergency traction device for pneumatic tires comprising a traction cleat composed of a longitudinally disposed shoe and a transverse channel shaped lug fixed thereto, a pair of channel shaped tire engaging clamp arms hingedly secured to the outer ends of the said transverse lug formed to engage the side walls of the tire near the rim of a wheel on which the tire is mounted and inwardly of the widest portion of the said tire, and a thong fixed to one tire engaging clamp arm extending across said transverse lug including toggle mechanism at the other end thereof adapted to engage the other tire engaging clamp arm whereby to removably secure the said traction device on a tire, the said thong and toggle mechanism being disposed between the flanges of the said channel shaped lug and clamp arms.

3. An emergency traction device for pneumatic tires comprising a transverse lug, a pair of tire engaging clamp arms hingedly secured to the outer ends of the transverse lug formed to engage the side walls of a tire near the rim of a wheel on which the tire is mounted and inwardly with respect to the widest portion of the said tire, a thong fixed at one end to one tire engaging clamp arm extending across said transverse lug adapted at its other end to tensionally engage the other tire engaging clamp arm whereby to removably secure the said traction device on a tire, and means for adjusting the length of the thong whereby to adapt the tire safety mechanism to fit tires of different section and of different stages of tread wear.

4. An emergency traction device for pneumatic tires comprising a traction cleat composed of a longitudinally disposed shoe and a transverse lug fixed thereto, a pair of tire engaging clamp arms hingedly secured to the outer ends of the said transverse lug formed to engage the side walls of the tire near the rim of a wheel on which the tire is mounted and inwardly of the widest portion of the said tire, a thong fixed to one tire engaging clamp arm extending across said transverse lug and including toggle mechanism at the other end thereof adapted to engage the other tire engaging clamp arm whereby to removably secure the said traction device on a tire, transverse depending ribs formed in said longitudinally disposed shoe cooperating with the tread of the tire on which the traction device is removably secured, and means for adjusting the length of the thong whereby to adapt the tire safety mechanism to fit tires of different section and of different stages of tread wear.

5. An emergency traction device for pneumatic tires comprising a channel shaped transverse lug, a pair of channel shaped tire engaging clamp arms hingedly secured to the outer ends of the transverse lug formed to engage the side walls of a tire near the rim of a wheel on which the tire is mounted and inwardly with respect to the widest portion of the said tire, a thong fixed at one end to one tire engaging clamp arm extending across said transverse lug including toggle mechanism on the other end thereof adapted to engage the other tire engaging clamp arm whereby to removably secure the said emergency traction device on a tire, the said thong and toggle mechanism being disposed between the flanges of the said channel shaped lug and clamp arms, and means for adjusting the length of the thong whereby to adapt the tire safety mechanism to fit tires of different section and of different stages of tread wear.

THEODORE DUNNER.
WILLIAM KELLER.

REFERENCES CITED

The following references are of record in the file of this patent:

UNITED STATES PATENTS

| Number | Name | Date |
| --- | --- | --- |
| 1,574,791 | Clark | Mar. 2, 1926 |
| 1,600,589 | Hipkins | Sept. 21, 1926 |
| 1,800,878 | Vosburgh | Apr. 14, 1931 |
| 1,941,935 | Erickson | Jan. 2, 1934 |